Nov. 15, 1938.   G. A. HALE ET AL   2,137,111
COIN CONTROLLED TIME MEASURING MECHANISM
Filed March 9, 1936    8 Sheets-Sheet 1

INVENTORS
Gerald A. Hale
Holger S. Theson
BY Loyal J. Miller
ATTORNEY

Nov. 15, 1938.     G. A. HALE ET AL     2,137,111
COIN CONTROLLED TIME MEASURING MECHANISM
Filed March 9, 1936     8 Sheets-Sheet 2

Nov. 15, 1938.    G. A. HALE ET AL    2,137,111
COIN CONTROLLED TIME MEASURING MECHANISM
Filed March 9, 1936    8 Sheets-Sheet 3

Nov. 15, 1938.   G. A. HALE ET AL   2,137,111
COIN CONTROLLED TIME MEASURING MECHANISM
Filed March 9, 1936    8 Sheets-Sheet 6

INVENTORS.
Gerald A. Hale
Holger S. Thuesen
BY
Lloyd S. Miller
ATTORNEY

Patented Nov. 15, 1938

2,137,111

UNITED STATES PATENT OFFICE 2,137,111

COIN CONTROLLED TIME MEASURING MECHANISM

Gerald A. Hale, Oklahoma City, and Holger G. Thuesen, Stillwater, Okla., assignors to Dual Parking Meter Company, a corporation of Delaware Application March 9, 1936, Serial No. 67,997

8 Claims. (Cl. 194—83)

Our invention relates to an improvement in meters for measuring time in predetermined periods, and more particularly to coin controlled meters of this type.

The objects of our invention are to provide a device of this class which can be manually rendered operable only after the insertion of a coin of predetermined denomination; which will allow coins of smaller diameter to pass through the device freely without following the normal route of a coin of proper denomination, and without operable engagement with the mechanism; which during its operation displays a time measuring signal or flag, the flag being so arranged as to disappear from visibility after a certain predetermined period of time has elapsed; which will visibly measure the passing of time until the predetermined period has elapsed; which can not be rendered operable without the flag being visibly displayed for the entire duration of the predetermined period of time; which will display the coin most recently inserted therein; the working parts of which are so arranged as to make it impossible for a person to maintain the flag in its visible position, beyond the predetermined period of time, by wedging or otherwise holding the operating key against rotation; which includes an auxiliary signal for notifying an operator when he has rotated the operating key sufficiently to place the device in operation; and, which will be efficient in accomplishing all the purposes for which it is intended.

With these and other objects in view as will more fully appear hereinbelow, our invention consists in the construction, novel features, and combination of parts hereinafter more fully described, pointed out in the claims hereto appended, and illustrated in the accompanying eight-sheet drawing, of which.

Like characters of reference designate like parts in all the figures.

It is understood that various changes in the form, proportion, size, shape, weight, material and other details of construction, within the scope of our invention may be resorted to without departing from the spirit or broad principle of our invention and without sacrificing any of the advantages thereof; and it is also understood that the drawings are to be interpreted as being illustrative and not restrictive.

The inventive idea involved is capable of receiving a variety of mechanical expressions one of which, for the purpose of illustrating the invention, is shown in the accompanying drawings.

The device consists substantially of front and rear plates spaced apart and held in position by four main plate posts; a coin disc operable by an operating key; a driven time gear wheel carrying a time indicator; a coin shuttle carrying a coin holder; a time measuring flag and assembly adapted to be raised by the shuttle co-acting with a flag lever, and lowered either by the manual rotation of the shuttle or mechanical rotation of the main gear, the coin disc, main gear, coin shuttle and a flag control lever all being rotatably mounted on a main bushing journaled between the front and rear plates; an independent propelling mechanism attached to the rear plate; a friction drive gear assembly connecting the propelling mechanism and the time gear; a clock control assembly adapted to stop the propelling mechanism after a predetermined time has elapsed and to start the mechanism when a new coin has been inserted and the device rendered operative. The complete device, including any suitable propelling mechanism, is adapted to be housed in a suitable housing having a transparent window for display of the flag during operation of the device, a perforation through one wall allowing rotation of the operating key therein and a coin slot in alignment with the coin receiver of the device. The housing is not a part of our invention.

The propelling unit will first be described. Referring to the drawings numeral 1 (Figs. 5 and 20) designates a housing which encloses any desired or usual gear train by which a shaft 2 (Fig. 20) is rotated at a predetermined average speed. The power may be provided either by electricity, by coiled spring, or any other desired means. The housing and gear train may be connected by screws or in any desired manner to a rear plate 4, (Fig. 5) so that its driving shaft 2 and its propeller unit control shaft 5 (Fig. 20) project beyond the rear plate in proximity to the rest of the mechanism. The shaft 2 carries a drive pinion 6 rotatable thereon between a metal friction plate 7 (Fig. 19) and a second washer or friction plate 8, (Fig. 20) which is preferably made of fibre or like material. The metal plate 7 is locked to rotate with the shaft 2. The friction plate 8 is also locked to rotate with the shaft 2 by means of an irregular shaped central perforation, the outer end of the shaft being similarly shaped. A three pronged spring member 9, having a central perforation of a shape similar to the end of the shaft 2, fits on the shaft and its prongs bear against the friction plate 8 pressing said plate against the side of the drive pinion 6, the opposite side of which in turn presses against the metal friction plate 7. This pressure is regulated by a nut 10 which screws on the outer threaded end of the shaft 2. As the shaft is driven by the propelling unit the friction against the sides of the drive gear is sufficient to cause the pinion to drive the rest of the mechanism. In case it is desirable to reverse the rotation of the rest of the mechanism, however, the friction is slight enough to allow this reverse rotation without unmeshing the drive pinion 6 from the driven gear, in which case the pinion rotates on the shaft 2 rather than with it.

Figure 20:
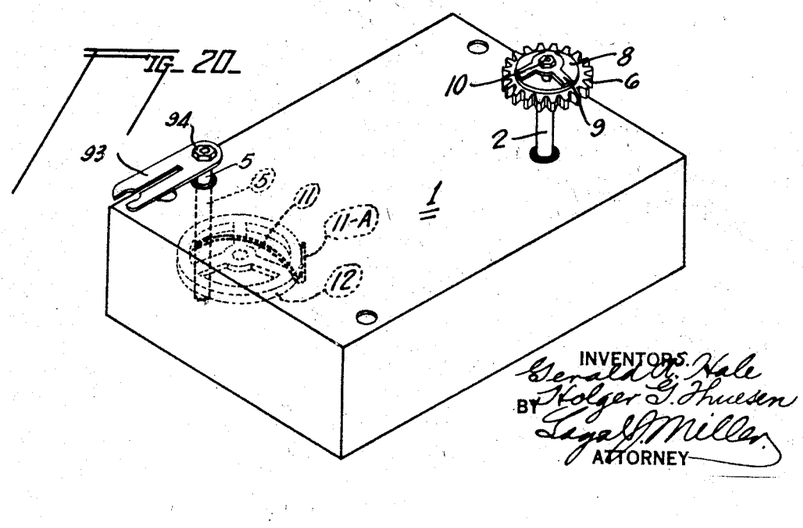
Figure 20 is a perspective view of a suitable housed propelling mechanism, parts being shown in dotted lines.

The propelling unit housing journals the unit control shaft 5 which carries intermediate its journaled ends an arm 11, shown dotted in Fig. 20. This arm may be made of light spring material, curved as shown at 11a, so that its end is in proximity to a usual balance wheel 12, in case a clock mechanism is used for power. In this case a partial rotation of the shaft 5 would cause the end of the arm 11 to contact the rim of the balance wheel thereby stopping the mechanism. When the shaft is rotated in the opposite direction the arm bearing against the balance wheel partially rotates the balance wheel before disengaging completely, thereby starting the clock mechanism. In all the drawings we have shown a spring operated clock mechanism as the propelling unit, but the propelling mechanism itself is not a part of the invention. It is only the control of the mechanism which we include and the mounting of the drive pinion 6 on the drive shaft 2. In case an electrically driven unit is used the arm 11 may be dispensed with and the shaft itself connected to a rotary electric switch, so that partial rotation of the shaft would complete the circuit and start the propelling mechanism, or stop it by reverse rotation. The means which we provide for rotating the shaft 5 will be later described hereinbelow.

For ease in description please now consider the propelling unit disconnected from our device, with only the pinion gear and a portion of the shaft 2, as well as a portion of the shaft 5 in mechanical relation with our device.

Figure 11:
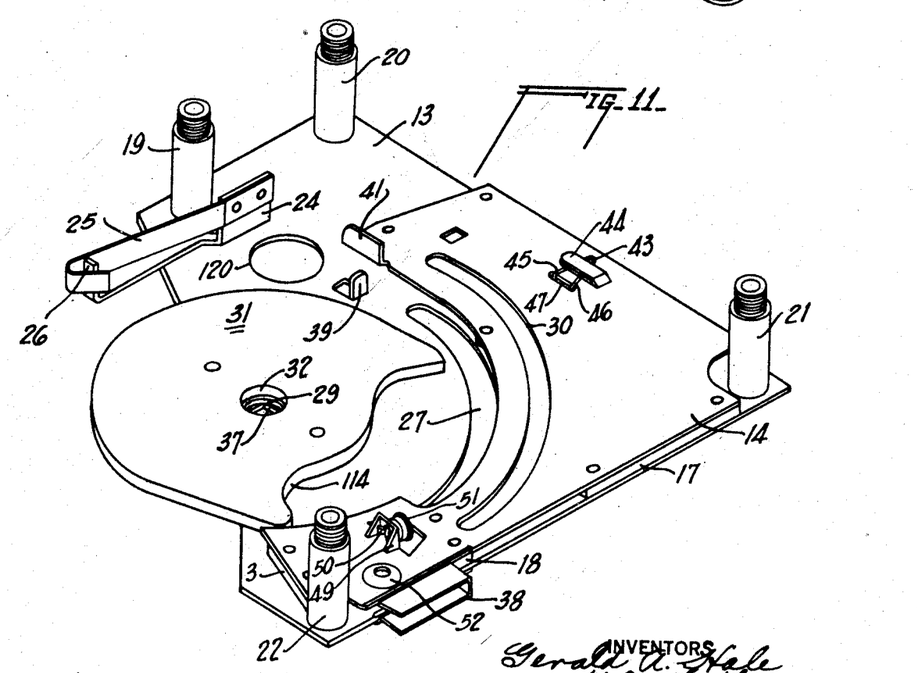
Figure 11 is a perspective view of the rear face of the front plate assembly.

Referring now more particularly to Fig. 11 the front plate assembly includes a front plate 13, a coin plate 14, riveted in spaced relation and held apart from the front plate by spacers 16, 17, and 18 (Figs. 11 and 21) of suitable shape and thickness. Riveted to the front plate near its four corners are four identical main plate binding posts 19, 20, 21, and 22 which hold the front and rear plates in spaced relation by means of nuts 23 (Fig. 5) which fit their reduced threaded ends.

Figure 7:
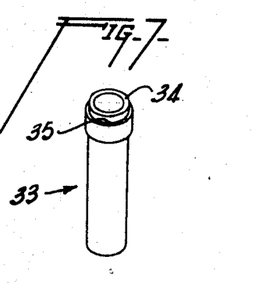
Figure 7 is a perspective view of the main bushing.

Adjacent the post 19, with its upper end projecting beyond the upper edge of the front plate 13 (Fig. 11) is riveted a flag latch bracket 24 to which is riveted a flexible flag latch 25. The upper end of the bracket is bent to form a lug 26 which serves to limit the forward and backward flexing movement of the latch 25. The front plate has an arcuate through slot 27 and an arcuate slot 28 of smaller radius (Fig. 3) both having a common center, which is also common with the center of a main bushing receiving perforation 29 (Fig. 11) in the front plate. An arcuate slot 30 of slightly greater radius than slot 27 but having a common center with it, is provided in the coin plate 14. A flat coin conveying disc 31 having a central perforation 32 is adapted to bear on and rotate around a shoulder 35 (Fig. 7) of a main bushing 33, one end 34 of which is journaled in the perforation 29 of the front plate. The coin conveying disc 31 is positioned adjacent the inner surface of the front plate 13 and rotates in the same plane as the space between the coin plate 14 and the front plate 13. The disc 31 carries a bracket 36 (Fig. 3) riveted thereto and held by the rivets in spaced relation to the outer surface of said front plate 13. One of the two rivets connecting these two members passes through the arcuate slot 28 (Fig. 3) and travels arcuately therein about the main bushing 33. The two rivets holding disc and bracket together are on opposite sides and equidistant from the perforation 32 (Figs. 24 and 25) of the coin disc 31 and serve to limit the rotation of the disc 31 by contacting the ends of slot 28 and the upper edge of front plate 13 simultaneously as the disc rotates in either direction about the bushing 33. The bracket has a square central perforation 37 (Fig. 11) whose center is common with the perforation 29 of the front plate. The purpose of the perforation 37 will be later described hereinbelow.

A coin receiver 38 is riveted on the front surface of plate 13 and is positioned adjacent the post 22 (Fig. 11) in alignment with the space between the front plate 13 and coin plate 14. A through perforation 120 (Figs. 1, 3 and 11) is provided in the plate 13 to allow the nut 10 and end of shaft 2 to project slightly therethrough. A machined lug 39 (Fig. 11 and Fig. 24) is provided on the plate 13 adjacent the lower end of slot 27 to guide the downward travel of a newly inserted coin, slug, or token or their mechanical equivalent 40, (Fig. 24) the travel of which will be later described hereinbelow.

Figure 3:
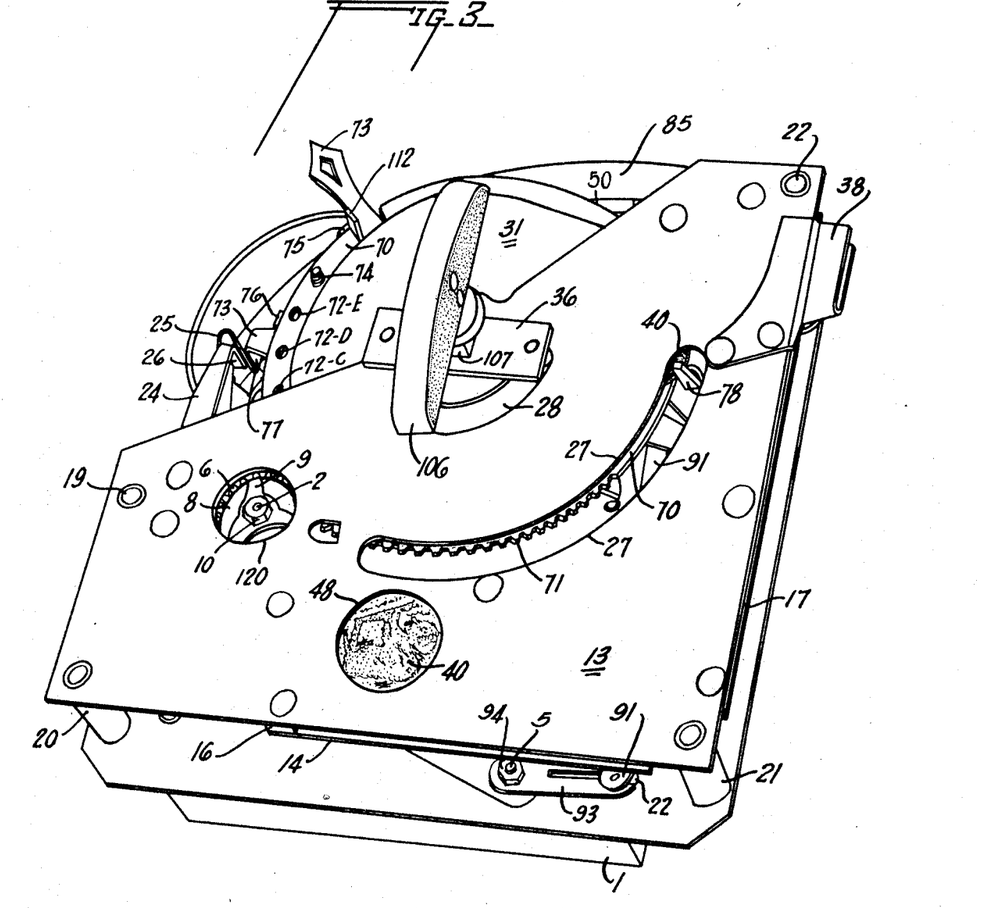
Figure 3 is a perspective view of the device complete taken from the front and showing the relative positions of the time indicating hand, the flag, the flag latch, the flag latch trip, and the clock control connector just after the predetermined period of time has elapsed, the flag having disappeared from visibility, and the propelling mechanism having been stopped.

The rear face of the coin plate 14 has an integral outstanding lug 41 (Fig. 11) adjacent the lug 39, as well as an integral lug 42 (Fig. 24) which acts as a coin guide and holder in co-operation with a coin spring 43 (Fig. 11) held in position by a machined tongue 44 and having its bent ends 45 and 46 (Figs. 11 and 24) projecting through a suitable slot 47 in the coin plate 14, and into the space between the plates 13 and 14. The lug 42 (Fig. 24) and the spring 43 are located on opposite sides of a circular perforation 48 (Fig. 3) in the front plate 13 and serve to hold the coin for visible display in this perforation. When the coin is pushed downward the spring end 45 (Fig. 24) is pushed aside by the edge of the coin as shown by the dotted lines in Fig. 23 and the coin is free to drop allowing the display of a newly inserted coin in the perforation 48 (Fig. 3).

Figure 5:
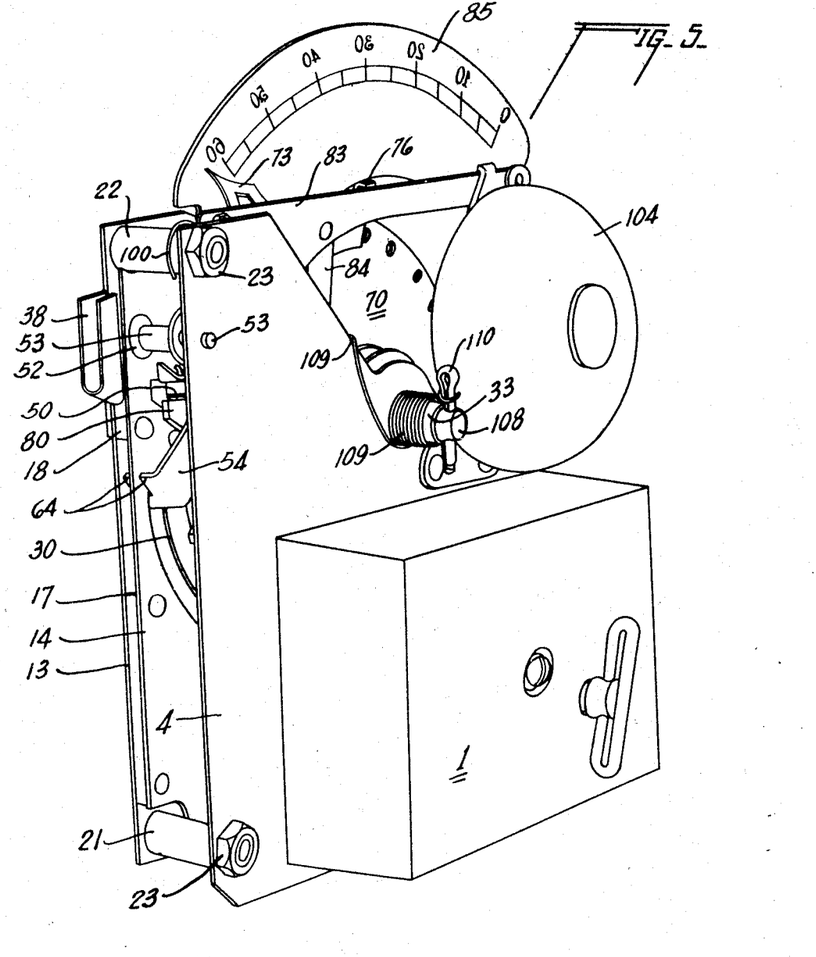
Figure 5 is a perspective view of the complete device taken from the rear and showing the relation of the clock mechanism to the rest of the device, as well as the relative positions of the flag, the time indicating hand, and the shuttle just after a coin has been inserted, the flag raised, and the device placed in operation.
Figures 12, 13, 14, 15, 16, 17, 18:
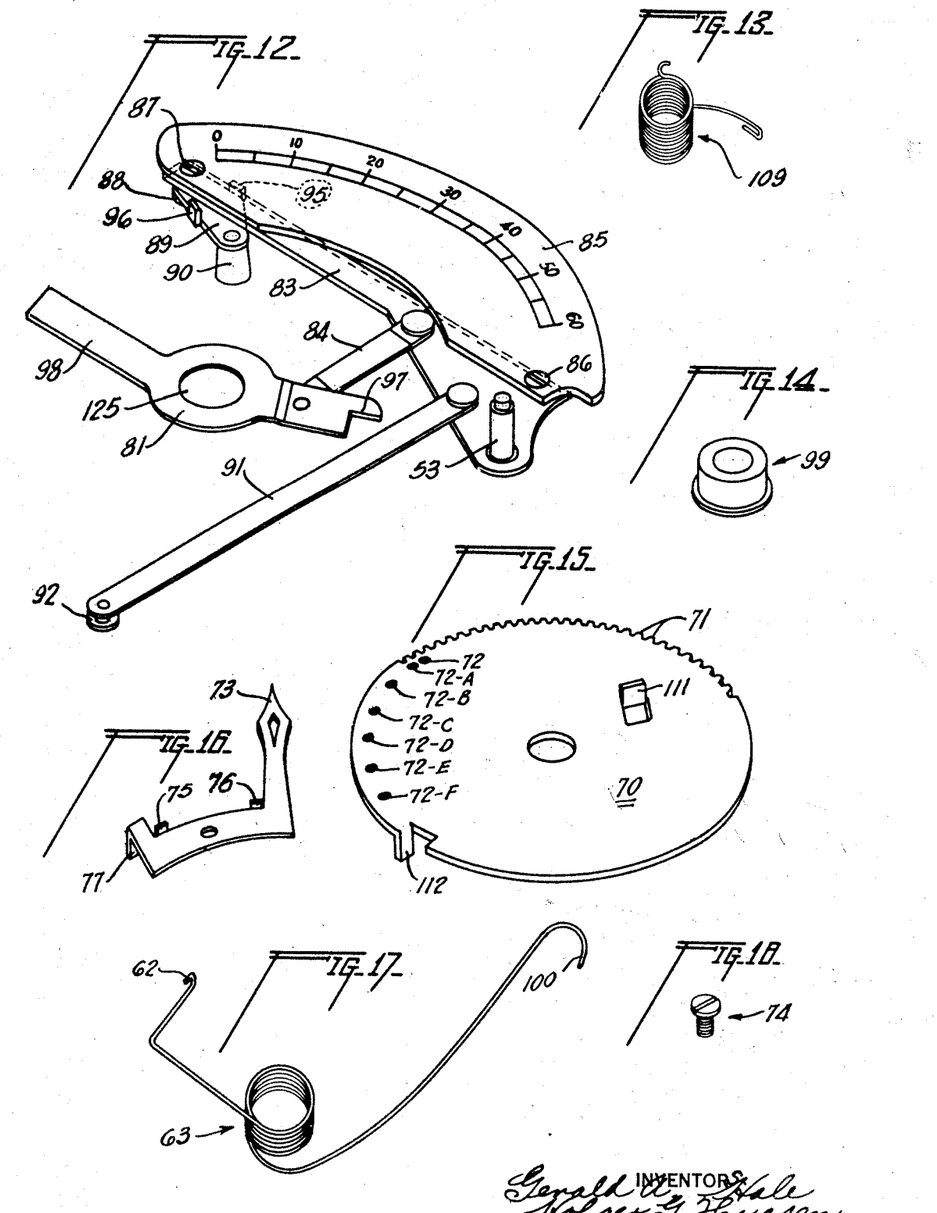
Figure 12 is a perspective view of the front face of the flag assembly.
Figure 13 is a perspective view of the operating key spring.
Figure 14 is a perspective view of the shuttle spring bushing.
Figure 15 is a perspective view of the main gear wheel.
Figure 16 is a perspective view of the time indicating hand and flag latch trip.
Figure 17 is a perspective view of the shuttle spring.
Figure 18 is a perspective view of the screw for attaching the time indicating hand to the main gear wheel.

The coin plate 14 carries an integral bumper bracket 49 (Fig. 11) centrally perforated to receive the split end of a bumper post 50 which holds an annular rubber bumper 51 against said bracket by having its split ends bent as shown in Fig. 11. The purpose of the bumper will be later explained. The plate 14 is also provided with a flag pivot bearing 52 (Fig. 11) which journals one end of a flag pivot 53 (Figs. 5 and 12).

Figures 8, 9:
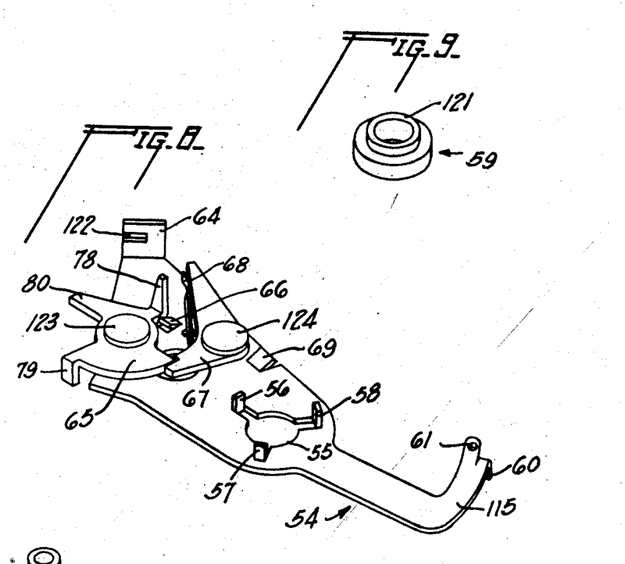
Figure 8 is a perspective view of the coin shuttle assembly.
Figure 9 is a perspective view of the coin shuttle bushing.

The coin shuttle assembly (Fig. 8) will next be described. A coin shuttle 54 is provided with a central perforation 55, which is of a size to receive the small end 121 of a shuttle bushing 59 which in turn fits around the previously described main bushing 33, allowing the shuttle 54 to rotate about the main bushing. One end 115 of the shuttle carries a perpendicular rearwardly extending lug 60, the purpose of which will be later explained, and also an eyelet 61 for receiving one end 62 (Fig. 17) of a shuttle spring 63. The opposite end of the shuttle 54 carries a forwardly extending slotted flange 64 (Figs. 5, 8 and 24) so positioned that its slot 122 lies in the same plane as the coin plate 14 when the shuttle is in assembled position, and so that the slot rotates in the same arc and is guided by the outer edge of slot 30 in the plate 14 (Figs. 5 and 11). Between the perforation 55 and flange 64 the shuttle carries a coin holder 65 (Figs. 8, 24 and 25) rotatably mounted on a bushing rivet 123 (Fig. 8).

Clockwise rotation of the coin holder 65 is limited by a forwardly extending machined lug 66 integral with the shuttle, and the counterclockwise rotation of the holder 65 is limited by a notched pawl 67, which is also rotatably mounted on the front side of the shuttle adjacent the coin holder 65, by means of a bushing rivet 124. A pawl spring 68 mounted on the shuttle bears against the outer end of the pawl and normally keeps the opposite notched end of the pawl in contact with the coin holder 65. The shuttle 54 is also provided with a machined lug 69 (Fig. 8) projecting beyond the front surface of the shuttle, the purpose of which will be later described.

Figure 19:
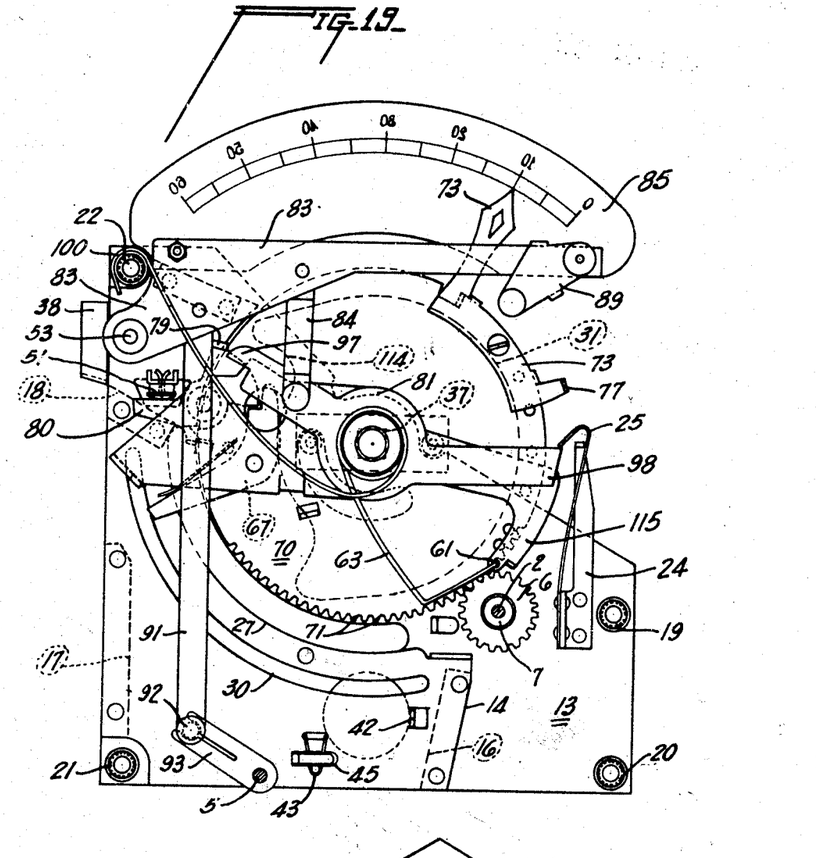
Figure 19 is a rear elevation of the device with the rear plate and clock mechanism removed showing the relative positions of the various parts while the machine is in operation and after most of the predetermined time has elapsed.

Between the shuttle 54 and the coin disc 31 in their assembled relation, a time gear 70 (Figs. 3 and 15) is rotatably mounted on the large portion 35 (Fig. 7) of the main bushing 33. A portion of its periphery carries teeth 71 (Figs. 3 and 15), which lie in the same plane and mesh with the teeth on drive pinion 6 (Figs. 19 and 20). Adjacent its outer periphery the gear 70 is provided with a plurality of spaced threaded perforations 72, 72A, 72B, 72C, 72D, 72E, and 72F (Fig. 15) for the purpose of securing on said gear 70 a time indicator 73 (Figs. 3 and 16) in various positions, by means of a screw 74 (Figs. 3 and 18) screwed into any of these perforations. Small lugs 75 and 76 (Figs. 3 and 16) are provided on the indicator 73 to contact the periphery of the gear 70 and prevent rotation of the indicator 73 about the screw 74. A flag latch trip 77 (Figs. 1, 3 and 16) is integral with and extends rearwardly from the indicator 73, and serves to contact and push outward the upper end of the flag latch 25 (Fig. 3), as the gear 70 is driven counterclockwise by the pinion 6.

The gear 70 has a rearwardly extending machined lug 111 (Fig. 15) which rotates with the gear in the same arc and in the same plane as the lug 69 (Fig. 8) carried by the shuttle 54. The lug 69 therefor contacts the lug 111 as the shuttle rotates in a clockwise direction, forcing the time gear 70 and the indicator 73 to rotate with the shuttle. The time gear 70 also has a forwardly extending lug 112 (Fig. 15) machined out of its outer edge which rotates with the gear (when the gear is in assembled position) in the same plane as the plane in which the front plate 13 lies. The lug serves to limit the clockwise rotation of the gear 70 by contacting the edge of the front plate 13 (shown in Fig. 1 about to contact the edge of front plate).

Figure 6:
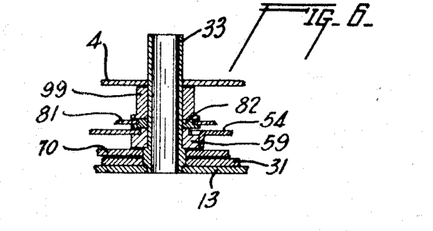
Figure 6 is a sectional view of the main bushing showing fragmentarily the parts assembled thereon.

The larger portion of the bushing 50 (Fig. 9) as well as the lugs 56, 57 and 58 (Fig. 8) theresurrounding serve to space the shuttle 54 away from the gear 70 and allow free movement of the coin holder 65 and pawl 67 therebetween (Fig. 6). The coin holder 65 has a forwardly extending arm 78 (Fig. 8) at right angles to the main body of the holder which in assembled position extends through the slot 27 (Figs. 1, 3, 24 and 25), and co-operates with the coin disc 31 to hold a coin 40 therebetween (clearly shown in Fig. 25) and to carry the coin thus held in an arc about the main bushing with the front plate 13 and the time gear 70 acting as side guides.

The coin holder 65 is also provided with a short rearwardly projecting lug 79 (Fig. 8) and an outwardly projecting arm 80, the purposes of which will be later described.

Figure 10:
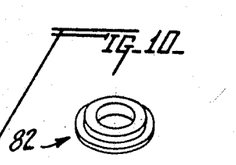
Figure 10 is a perspective view of the flag lever bushing.

We will now describe the flag assembly (Fig. 12) which consists substantially of the following described elements: a flag lever 81; a flag lever bushing 82, (Fig. 10) whose central perforation fits the main bushing 33, the small portion of which fits the central perforation 125 of the flag lever 81, and the large portion of which acts to space the lever 81 from the shuttle 54 (Fig. 6); a flag bracket 83 (Fig. 12); a connector link 84 pivoted at one end by a bushing rivet to the flag lever 81 and at its other end pivoted to the flag bracket 83; a flag pivot 53; a flag 85 fastened to the upper edge of the bracket 83 by means of a screw 86 screwed into a threaded perforation in the bracket 83 and a bolt 87 (Fig. 12) fitted with an interiorly threaded bushing nut 88 (Figs. 1 and 12) on which is pivoted a clapper bracket 89 carrying a clapper 90; and a clock control link 91 having one of its ends pivoted to the flag bracket 83 adjacent the pivot 53, by means of a bushing rivet. The opposite or free end of the link 91 is fitted with a bushing rivet 92 which in operating position fits between the forked ends of a clock control connector 93 (Figs. 19 and 20) which in turn is locked in position on the shaft 5 by means of a nut 94 (Figs. 3 and 20). This relation is best shown in Figs. 3, 19, 21, 22 and 23, and will be further elaborated.

The flag 85 is preferably constructed of colored transparent material such as Celluloid or the like, and preferably has printed thereon an arcuate time measuring scale with indicating numerals included. The clapper bracket 89 is provided with two forwardly projecting lugs 95 and 96 (Figs. 1 and 12) which limit its rotation in both directions by contacting the upper and lower edges respectively of the flag bracket 83. The flag lever has a notched end 97, and the entire lever rotates about the main bushing 33 in the same plane, as the lug 79 (Fig. 8) of the coin holder 65 which is carried by the coin shuttle 54. With the coin holder 65 held at its limit of clockwise rotation about its own axis, the lug 79 freely passes the end 97 of the flag lever 81 as either the shuttle 54 or lever 81 rotate about the main bushing. With the coin holder held at its limit of counterclockwise rotation, however, the lug 79 of the coin holder 65 contacts the end 97 of the flag lever and forces the lever to rotate with the shuttle 54 as the shuttle rotates about the main bushing 33. This relative rotation will later be explained more fully. The opposite end 98 of the flag lever 81 is of a length and rotates in the proper plane to be contacted by the flag latch 28 (Figs. 1 and 11) in normal position, and is thus prevented from clockwise rotation until the flag latch is released.

Figure 21:
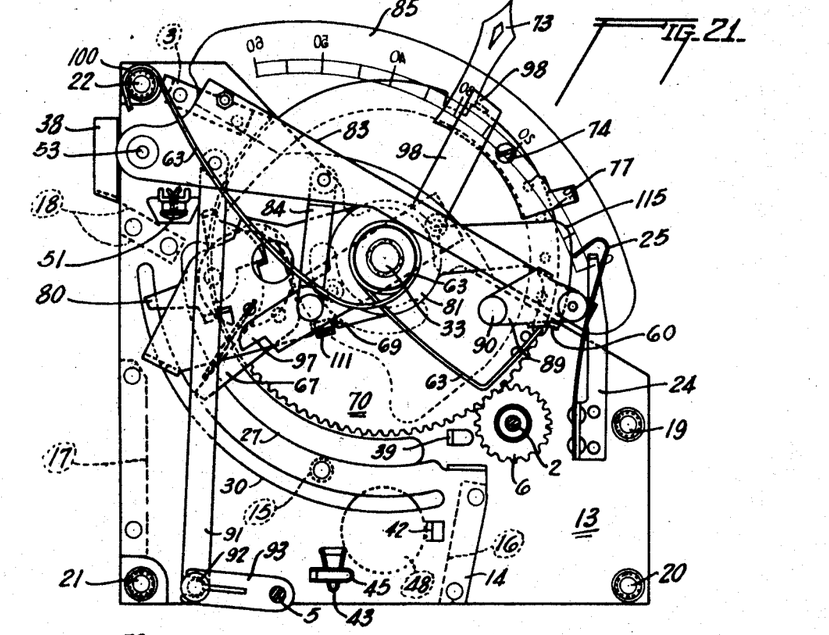
Figure 21 is a rear elevation with the rear plate and clock mechanism removed showing the relative positions of the various parts before the predetermined time has elapsed but just after the insertion of another coin and during the clockwise rotation of the operating key, the flag having just dropped from visibility.

Fitting adjacent the flag lever 81 and its bushing 82 on the main bushing 33 is a shuttle spring bushing 99 (Figs. 6 and 14) which serves to center and hold the coiled portion of the shuttle spring 63 (Figs. 17, 19, and 21). The end 100 (Fig. 17) of the shuttle spring bears against the main plate binding post as shown clearly in Figs. 5 and 21. With the end 62 of the spring 63 anchored in eyelet 61 of the shuttle 54 (Fig. 19) the spring 63 normally tends to hold the shuttle at its limit of counterclockwise rotation, this rotation being limited by the arm 80 of the coin holder 65 bearing against the bumper post 50 (Figs. 5 and 19).

The rear plate 4 (Figs. 4 and 5) is next in order of assembly and has four corner perforations to receive the threaded ends of posts 19, 20, 21 and 22 (Fig. 11) and is held thereon by nuts 23 (Fig. 5). It has a central perforation 101 (Fig. 4) for journaling one end of the main bushing 33, and is also provided with a large irregular shaped opening 102 which permits operative relations between our device and the propelling mechanism. The rear plate also carries a bell bracket 103 on the outer end of which is secured a bell 104 (Fig. 1) by means of a screw through the bracket. The rear plate also is provided with a flag pivot bearing 105 (Fig. 4) which journals one end of the flag pivot 53 (Figs. 5 and 12), the other end being journaled in bearing 52 (Figs. 5 and 11) of the coin plate 14.

An operating key 106 (Fig. 2) has a square shoulder 107 near its outer end, and the remainder of its shank 108 is cylindrical and is journaled by the central bore of the main bushing 33, as shown in Fig. 5. The main bushing projects beyond the outer surface of the rear plate 4 and this projecting end carries the coiled portion of an operating key spring 109 (Figs. 5 and 13) having one hooked end bearing on a cotter key 110 (Fig. 5) through the end of the shank 108 of the operating key, and its other end hooking over the edge of the rear plate 4 (Fig. 5). The square shoulder 107 of the operating key seats in the square perforation 37 (Fig. 11) of the coin disc bracket 36 (Figs. 1 and 3) locking the bracket 36 and the coin disc 31 to rotate with the operating key 106. The spring 109 (Fig. 5) tends to keep the operating key 106 and the coin disc 31 at their limit of counterclockwise rotation, rotation in this direction being limited as previously described. This normal position of the coin disc 31 is shown in Fig. 19.

Figure 4:
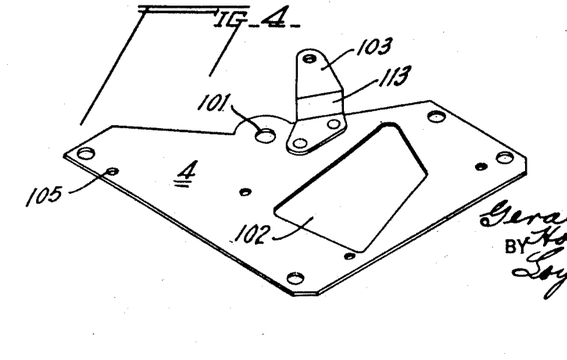
Figure 4 is a perspective view of the rear face of the rear plate with its bell bracket attached.

The description thus far has shown the order of assembly of the parts. The assembled relation of the various parts on the main bushing 33 is clearly shown in Fig. 6 which also shows the relative spacing of the parts. From bottom to top in Fig. 6, which is the order of assembly, there are: front plate 13 (Fig. 11), coin disc 31 (Fig. 11), time gear 70 (Fig. 15), shuttle bushing 50 (Fig. 9), shuttle 54 (Fig. 8), flag lever bushing 82 (Fig. 10), flag lever 81 (Fig. 12), shuttle spring bushing 99 (Fig. 14), and rear plate 4 (Fig. 4). With the device thus assembled the propelling mechanism is secured in position on the rear plate 4 with the teeth of the pinion 6 meshing with the teeth 71 on the time gear 70, (Fig. 19), and the bushing rivet 92 on the lower end of the clock control link 81 is forced by slight pressure between the forked ends of the connector 93 and is held in operative relation by side pressure of the forked ends. (Clearly shown in Figs. 3, 19, and 23.)

With the device thus assembled its operation will now be described. Please bear in mind that when the flag is in a "raised" position it is visible from the outside of a suitable housing (not shown) in which the meter is enclosed, and that when the coin is visible in the perforation 48 (Fig. 3) of the front plate, it may also be seen through a glass window (not shown) in the housing; also that the operating key extends through the wall of the housing so that the key may be manually rotated from the outside.

Fig. 3 shows the normal relative positions of the parts when the meter is inoperative. The main gear 70 has been driven to its limit of counterclockwise rotation and the trip 77 has pushed back the flag latch 25 thereby releasing the end 98 (Figs. 12 and 19) of the flag control lever 81, and the weight of the flag 85 and flag bracket 83 has caused the flag to rotate on its pivot 53 and to drop out of sight, the connector 84 forcing the lever 81 to rotate clockwise, the drop of the flag 85 and the clockwise rotation of the lever 81 being limited by the clapper 90 on the clapper bracket 89 contacting the offset shoulder 113 (Fig. 4) of the bracket 103. The notched end 97 of the flag lever does not contact the lug 79 of the coin holder 65 during this rotation (see Fig. 19) because the coin holder is in its normal position at the limit of its clockwise rotation about its own axis. As the flag drops the control link 91 is forced downward causing connector 93 to partially rotate shaft 5 clockwise, which rotation brings the spring arm 11 (Fig. 20) into contact with the rim of the balance wheel 12, stopping the clock mechanism. This applies, of course, in case a clock mechanism is used to propel our meter. If an electric propelling mechanism is used, the inner end of the shaft 5 is simply locked to rotate with a suitable rotary switch (not shown). Rotation of the shaft clockwise would break the circuit and rotation counterclockwise would complete the circuit.

The last coin inserted in the meter is displayed in the perforation 48 of the front plate 13, being held in this position by one end 45 (Figs. 19 and 23) of the coin spring in co-operation with the lug 42. A new coin inserted in a coin slot in the housing (not shown) drops into the coin receiver 38 and is thereby guided into the space between the coin plate 14 and the front plate 13, rolls downward and inward on the upper edge of spacer 18 (Fig. 19) until its edge seats against the upper concave edge 114 (Figs. 11, 19 and 25) of the coin disc 31, and the lower edge of the coin rests on the arm 78 of the coin holder (Figs. 3, 8 and 25).

Figure 25:
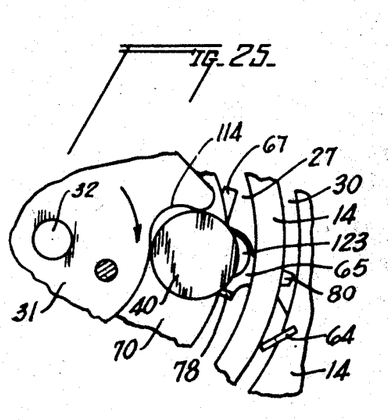

Manual rotation of the operating key 106 clockwise rotates the coin disc 31, as previously described, the coin transmitting pressure from the disc to the arm 78 of the coin holder 65 and causing the shuttle 54 and its assembled parts (as shown in Fig. 8) to rotate (as shown in Figs. 21 and 25) clockwise with the disc 31. It will be noted that the back pressure of the shuttle spring holds the coin between the coin disc 31 and the arm 78 (Fig. 25) during the arcuate travel of the coin with these two members, but that the pressure of the edge of the coin on the arm 78 tends also to rotate the coin holder 65 (of which arm 78 is an integral part) about its own axis of rotation counterclockwise, but that the pawl 67 (Fig. 8) prevents this rotation.

The clockwise rotation and corresponding relative movement of the various parts is clearly shown in Fig. 21. As the shuttle rotates, its lug 69 contacts lug 111 of the time gear and thus rotates it to its limit of clockwise rotation, and places the indicator 73 in a position to measure the passing of time against the scale on the flag 85. If it is desired to measure the maximum period of time the indicator is attached to the time gear 70 at perforation 72F (Fig. 15). If a less period of time is desired the indicator may be attached at any of the other perforations, depending on the length of time desired to be measured.

It will also be noted that in case the predetermined time has not elapsed before a new coin is inserted, and the flag is still in a raised position (see Fig. 19) the end 115 (Figs. 8 and 21) of the shuttle 54 in passing pushes the flag latch 25 outward and releases the end 98 of the flag lever 81 allowing the flag to drop by gravity. In case the flag fails to drop by gravity after the end 98 has been released, the lug 60 (Fig. 21) of the shuttle 54 contacts the lower edge of end 98 forcing the flag lever 81 to rotate clockwise with the shuttle, which in turn forces the flag downward out of sight. The desirability of this feature is very important. The operator must necessarily force the various parts of the device through a complete cycle of movement before the timing mechanism can begin operating.

Figure 23:
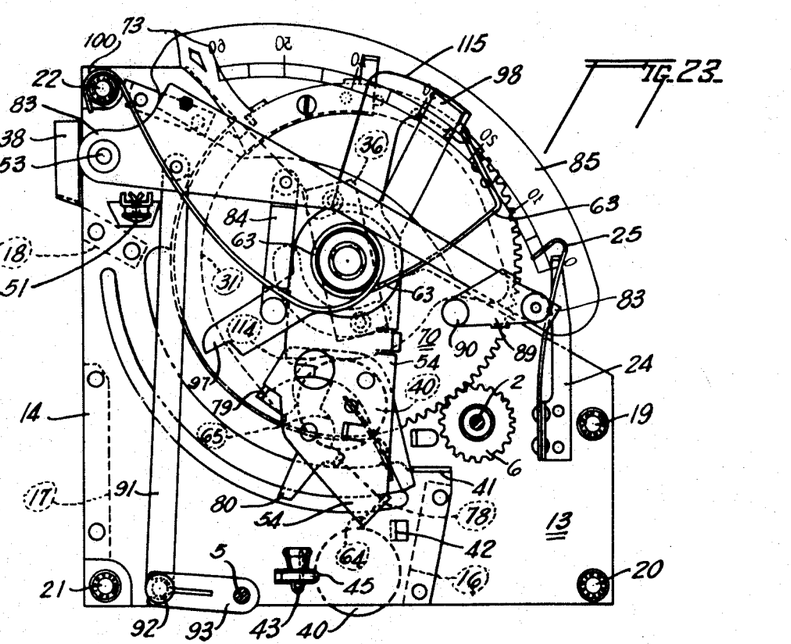
Figure 23 is a view similar to Fig. 21 but showing the relative positions of the various parts just after rotation of the operating key to the limit of its throw in a clockwise direction and as the shuttle is beginning its return to normal position, the flag having just started in its upward movement.
Figure 24:
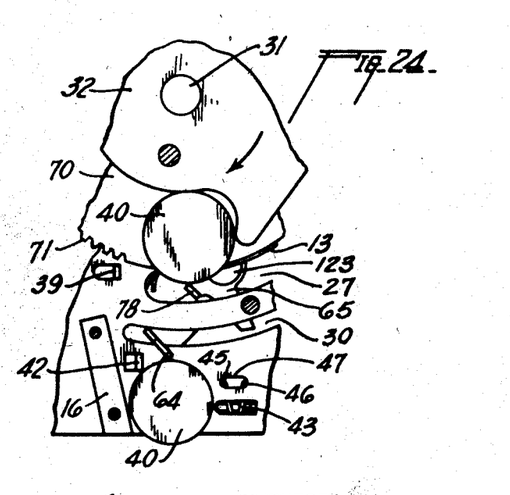
Figure 24 is a view showing a newly inserted coin and the previously inserted coin and their relation to various parts of the device which are only fragmentarily shown; and, Figure 25 is a view similar to Fig. 24 but shows the relation of the various parts before they reach the positions shown in Fig. 24.

Fig. 23 shows the relation of the various parts just as they reach their limit of clockwise rotation, such rotation being caused, of course, by manual rotation of the operating key 106. The lower end of the pawl 67 has contacted the lug 41, which contact has partially rotated the pawl, moving its upper notched end away from the coin holder 65. The pressure of the coin disc 31 on the coin 40 and of the edge of the coin downward on the arm 78 has caused the coin holder 65 to partially rotate about its axis. The arm 78 is thus moved away from the coin disc 31 a sufficient distance to allow the coin 40 to pass therebetween, which simultaneously allows the shuttle spring 63 to rotate the shuttle 54 and coin holder 65 in a counterclockwise direction (Figs. 23 and 24). The coin now freely drops toward the lug 39 (Fig. 24) which guides it downward where it is held by lug 42 and spring 43 visibly displayed in the perforation 48 (as shown in Fig. 3). During the clockwise rotation of the shuttle and before it reaches its limit of rotation, the edge of its slotted flange 64 (Fig. 23) contacts the edge of the previously inserted coin and pushes it downward past the end 45 of coin spring 43 (Fig. 24) whence it drops into any suitable receptacle therebelow, and clears the perforation 48 for display of the newly inserted coin 40.

By observing Fig. 23 it will be noted that as the arm 78 of the coin holder partially rotates the holder 65, the lug 79 of the coin holder moves inward toward the main bushing reducing the arc in which it travels with the shuttle, so that as the shuttle rotates counterclockwise the outer surface of the lug 79 contacts the notched end 97 of the flag lever 81, and rotates said lever. Fig. 25 shows the relative position of coin holder, coin disc, and coin before the release of the pawl 67 allows the coin holder 65 to rotate about its axis, and Fig. 24 shows the relation of these members after the pawl has been tripped and has released the holder 65.

Figure 22:
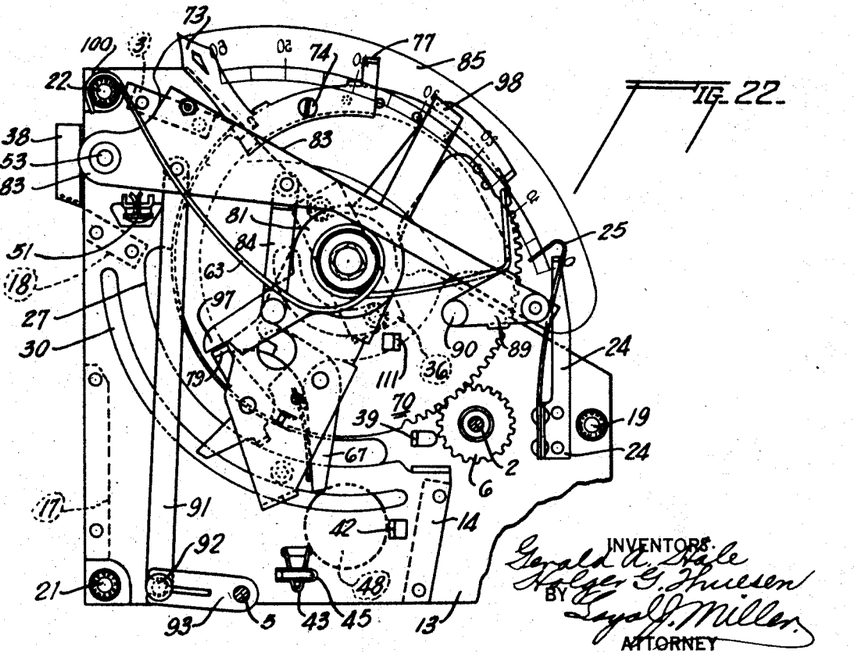
Figure 22 is a view similar to Fig. 21 but shows the relative positions of the various parts after the operating coin has dropped into visibility in the window; the shuttle is traveling counter-clockwise on its return to normal position, the flag being about to be raised by the shuttle and the propelling mechanism being about to be started.

Fig. 22 shows the relation of the various parts during their counterclockwise rotation, and after the newly inserted coin has dropped in the display perforation 48. The shuttle spring 63 is, of course, causing the counterclockwise rotation of the shuttle. Control of any part of the internal mechanism is lost to the operator at the instant the coin holder rotates, as just described. In other words the coin is necessary to allow an operator to place our device in operating condition, and after being placed in operative condition the internal parts co-operate to set our meter in operation without additional help from the operator.

As the shuttle returns (Fig. 22) to its normal position, the contact of the lug 79 rotates the lever 81, causes the connector 84 to forcibly push the flag bracket 83 and flag 85 (Fig. 22) into a raised position, visible through glass windows in the housing (not shown). As the flag raises and the lever 81 rotates, the end 98 of the flag lever pushes the flag latch 25 outward and after the end 98 passes the flag latch 25, the latch 25 returns to normal position and its extreme end prevents clockwise rotation of the flag lever 81, thus holding the flag in a raised position until the latch 25 is again forced outward.

Figure 1:
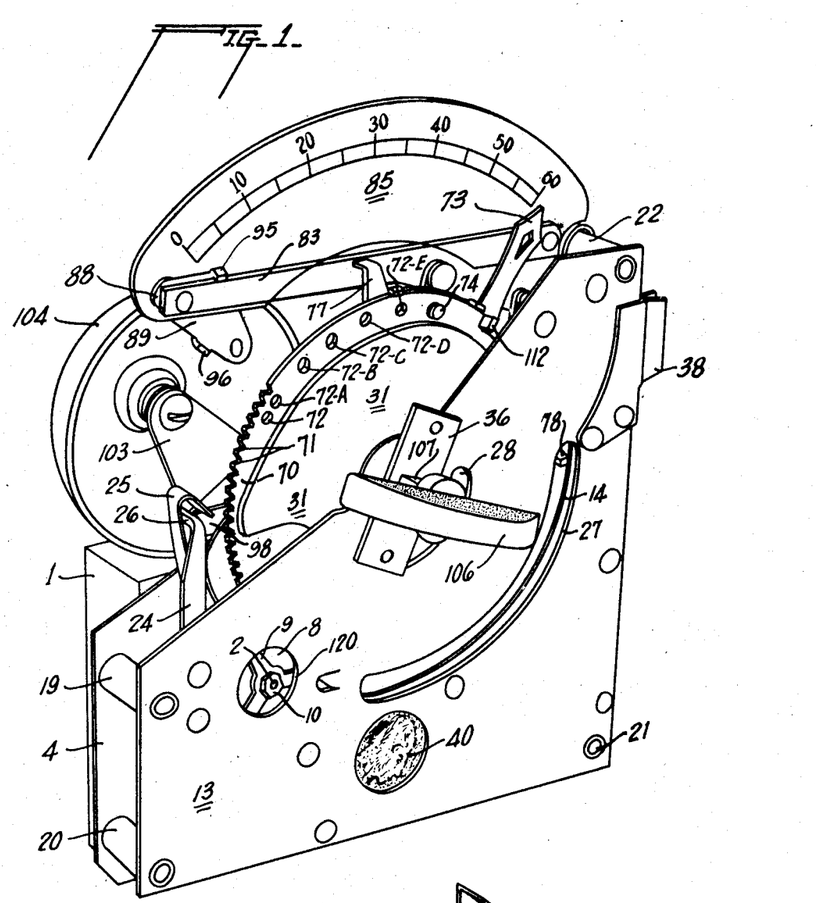
Figure 1 is a perspective view of the device complete taken from the front and showing the relative positions of the time indicating hand, the flag, and the operating key, just after the device has been placed in operation, and before the operating key has been released by the operator.
Figure 2:
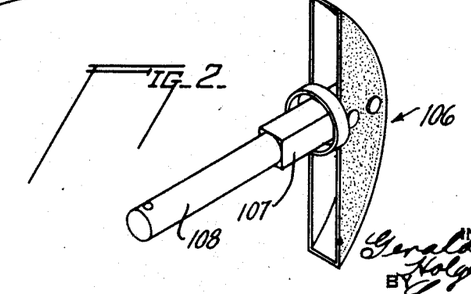
Figure 2 is a perspective view of the operating key.

We have now followed the complete cycle of operation, and the various parts of our meter are now in the relation shown in Figs. 1, 5 and 19, with the exception that Fig. 19 shows the indicator in a position indicating that all the predetermined time save ten minutes has elapsed. The device is in operation, the propelling mechanism having been started by the partial rotation of the shaft 5, and the consequent action of the spring arm 11 on the balance wheel 12, as previously described. The rotation of the shaft 5 was caused by the raising of the link 91 (Fig. 19) with the flag bracket, in connection with the forked connector 83.

The shuttle spring has sufficient tension to cause almost instantaneous action of the parts as just described. As the flag raises the clapper 99 rings the inner surface of the bell 104, audibly notifying the operator that the device has started operation. The rising of the flag visibly notifies the operator that the device has started operation.

Obviously, the invention is susceptible of embodiment in forms other than that which is illustrated in the accompanying drawings and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In a coin controlled device: a manually rotatable coin disc having a peripheral arcuate slot for contacting a coin edge; a coin shuttle independently rotatable about an axis common to the axis of said disc and in close proximity thereto; a coin holder rotatably mounted on said shuttle and including an integral arm projecting axially toward the slot in said coin disc; a coin holder pawl rotatably mounted on said shuttle adjacent said holder and normally adapted to limit the rotation of the coin holder in one direction about its axis; a fixed pawl release member; means for guiding a coin to a position between the coin holder arm and the slotted edge of the disc; said holder and disc being so constructed and positioned as to be locked to rotate together by a coin held therebetween; said pawl release member adapted to partially rotate said pawl after a predetermined travel of disc and shuttle, thus releasing said coin holder to partial rotation relative to the coin disc, thus releasing the coin from between the two and dissolving their locked relation; and power means for returning the shuttle and coin holder to their original positions after the release of the coin.

2. In a coin controlled device: a manually rotatable coin disc having a peripheral arcuate slot for contacting a coin edge; a coin shuttle independently rotatable about an axis common to the axis of said disc and in close proximity thereto; a coin holder rotatably mounted on said shuttle and including an integral arm projecting axially toward the slot in said coin disc; a coin holder pawl rotatably mounted on said shuttle adjacent said holder and normally adapted to limit the rotation of the coin holder in one direction about its axis; a fixed pawl release member; means for guiding a coin to a position between the coin holder arm and the slotted edge of the disc; said holder and disc being so constructed and positioned as to be locked to rotate together by a coin held therebetween; said pawl release member adapted to partially rotate said pawl after a predetermined travel of disc and shuttle, thus releasing said coin holder to partial rotation relative to the coin disc, thus releasing the coin from between the two and dissolving their locked relation; power means for returning the shuttle and coin holder to their original positions after the release of the coin; a movable operation disclosing signal; means for moving the signal into an operation disclosing position, said means being so constructed and positioned as to be motivated by said coin holder only as the shuttle is returned to its normal position, thus moving said signal to its operation disclosing position; means for maintaining the signal in its operation disclosing position; and means for moving the signal away from its operation disclosing position.

3. The combination with a propelling mechanism adapted to rotate a drive shaft at a predetermined average speed of: a time measuring flag; a rotatably mounted coin disc; a rotatably mounted time gear having a time indicator attached thereto; a rotatably mounted coin shuttle; said disc, gear, and shuttle rotatable in different planes about a common axis; coin controlled means for manually rotating said shuttle in one direction; spring means for rotating said shuttle in the opposite direction; a coin holder rotatably mounted on said shuttle adapted to be carried in an arc about said shuttle axis as said shuttle rotates, and to co-operate with the edge of said coin disc to hold a coin therebetween; said coin adapted to lock said shuttle to rotate in one direction with said coin disc; means for releasing said coin from between said disc and coin holder and means for simultaneously partially rotating said coin holder about its axis reducing the arc in which its upper end travels with said shuttle; spring means for speedily returning said shuttle to its normal position; a flag control lever rotatable about said common axis adapted to raise said flag into visibility as it rotates in one direction and to lower said flag out of visibility as it rotates in the opposite direction; said upper end of said coin holder, as it returns to normal position with said shuttle, adapted to engage said control lever and raise said flag; means operably connected to said control lever for starting said propelling mechanism as said flag is raised, and for stopping said mechanism as said flag is lowered; means for frictionally connecting said drive shaft to drive said time gear; and means for manually rotating said coin disc.

4. In a coin controlled time measuring meter, the combination with a propelling mechanism adapted to rotate a drive shaft at a predetermined average speed, of: a front plate; a rear plate; means for holding said plates in spaced relation; a main bushing journaled between said plates; a coin plate held in spaced relation on the inner surface of said front plate; a coin receiver for receiving and guiding a coin between said front and coin plates; a coin disc manually rotatable about said main bushing in a plane between said front and coin plates; a time gear rotatable about said main bushing; a time indicator carried by said time gear; a coin shuttle rotatable about said main bushing; a coin holder and a coin holder pawl carried by said shuttle and rotatably mounted thereon on separate axes; a time measuring flag pivoted at one of its ends between said coin and rear plates; a flag control lever for raising and lowering said flag rotatable about said main bushing; an operating key journaled in a central bore of said main bushing and locked to rotate with said coin disc; said shuttle adapted to be locked to rotate with said coin disc by a coin held at its edges between said disc and said coin holder; said holder adapted to release said coin and said locked relation of coin disc and shuttle simultaneously as said pawl limits the manual rotation of said shuttle; a shuttle spring for returning said shuttle, coin holder, and pawl to their normal positions after being thus released; said coin holder adapted to rotate said flag lever and raise said flag as said holder is returning to its normal position; means for connecting said drive shaft to said time gear to rotate said time gear as said drive shaft rotates.

5. In a coin controlled meter for measuring a predetermined period of time, the combination with a propelling mechanism adapted to operate at a given average speed, of: a time gear adapted to be rotated by said mechanism; a time indicator adjustably attached to said time gear; a movable time measuring flag; a flag control lever for raising and lowering said flag; a coin controlled shuttle manually rotatable in one direction; a spring for rotating said shuttle in the opposite direction; a manually rotatable coin disc; said shuttle adapted to be locked to rotate in one direction with said coin disc by a coin; means for discontinuing said locked relation of said shuttle, coin, and coin disc as said shuttle reaches its limit of manual rotation, allowing said spring to return said shuttle to its normal position; said shuttle, during its rotation by said spring, adapted to contact and to rotate said flag control lever, thus raising said flag; and spring means for returning said coin disc to normal position.

6. In a coin controlled device: a manually operable rotatably mounted coin contacting disc; a concentrically mounted independently rotatable coin shuttle; a rotatably mounted coin contacting member carried by the shuttle; said member and said disc adapted to contact the edges of a coin and cooperatively hold the coin therebetween, and adapted to thus lock the shuttle to rotate with the disc; and cooperating means for partially rotating said coin contacting member with relation to shuttle and disc, thus releasing the coin and breaking the locked relation of shuttle and disc as they reach a predetermined point in their travel.

7. In a coin controlled device: a coin chute; a rotatable coin disc; a rotatable coin shuttle; a coin holder pivotally mounted on said shuttle; said holder and said disc adapted to contact opposite edges of a coin and to thus cooperatively hold a coin therebetween, and said shuttle and coin disc adapted to be locked to rotate together by said coin; said disc and shuttle, as they rotate together, adapted to carry said coin to said coin chute, and means for rotating said coin holder on said shuttle after the coin has reached a point above the coin chute, thereby releasing said coin from between said disc and holder, and dissolving the locked relation of disc and shuttle.

8. A parking meter including: a timing mechanism; an indicator; means cooperating with the indicator to indicate time; a coin controlled means for setting the indicator, said means adapted to hold an inserted coin until the indicator setting operation has been fully completed, and operative connections between the timing mechanism and the setting means rendering the timing mechanism inoperable until after the setting operation has been fully completed.

GERALD A. HALE.
HOLGER G. THUESEN.